United States Patent
Flickner et al.

(10) Patent No.: US 8,707,099 B1
(45) Date of Patent: Apr. 22, 2014

(54) DYNAMIC CUE GENERATOR

(75) Inventors: Brett J. Flickner, Folsom, CA (US); Charles E. Preston, Orangevale, CA (US); Daniel M. Saldana, Carmichael, CA (US); Charles B. Clupper, El Dorado Hills, CA (US); Christopher M. Pettigrew, Rocklin, CA (US)

(73) Assignee: DST Output West, LLC, El Dorado Hills, CA (US)

( * ) Notice: Subject to any disclaimer, the term of this patent is extended or adjusted under 35 U.S.C. 154(b) by 257 days.

(21) Appl. No.: 13/213,798

(22) Filed: Aug. 19, 2011

Related U.S. Application Data

(60) Provisional application No. 61/375,349, filed on Aug. 20, 2010.

(51) Int. Cl.
*G06F 11/00* (2006.01)
(52) U.S. Cl.
USPC .................................. 714/25; 714/32; 714/51

(58) Field of Classification Search
USPC ......... 714/25, 32, 33, 34, 37, 45, 47.1, 48, 51
See application file for complete search history.

(56) References Cited

U.S. PATENT DOCUMENTS

| | | | |
|---|---|---|---|
| 6,854,076 B2 * | 2/2005 | Burt et al. ..................... | 714/700 |
| 7,712,014 B2 * | 5/2010 | Hessen-Schmidt ........... | 714/798 |
| 2013/0082751 A1 * | 4/2013 | Lee ............................... | 327/155 |

* cited by examiner

*Primary Examiner* — Joseph D Manoskey
(74) *Attorney, Agent, or Firm* — James M. Ritchey

(57) ABSTRACT

A dynamic cue signal generator and method for processing one or more input and output signals to synchronize the operation of one or more associated machines and includes processes for creating a signal delay between receiving an input signal and issuing an output signal, for conditioning an input signal to produce an output signal with required parameters, for producing a plurality of outputs signals, for filling in undetected cues in an input signal to create a filled-in output signal, for filtering noise from an input signal to generate a noiseless output signal, and for generating an error output signal to indicate that an unusual event occurs in an input signal.

6 Claims, 7 Drawing Sheets

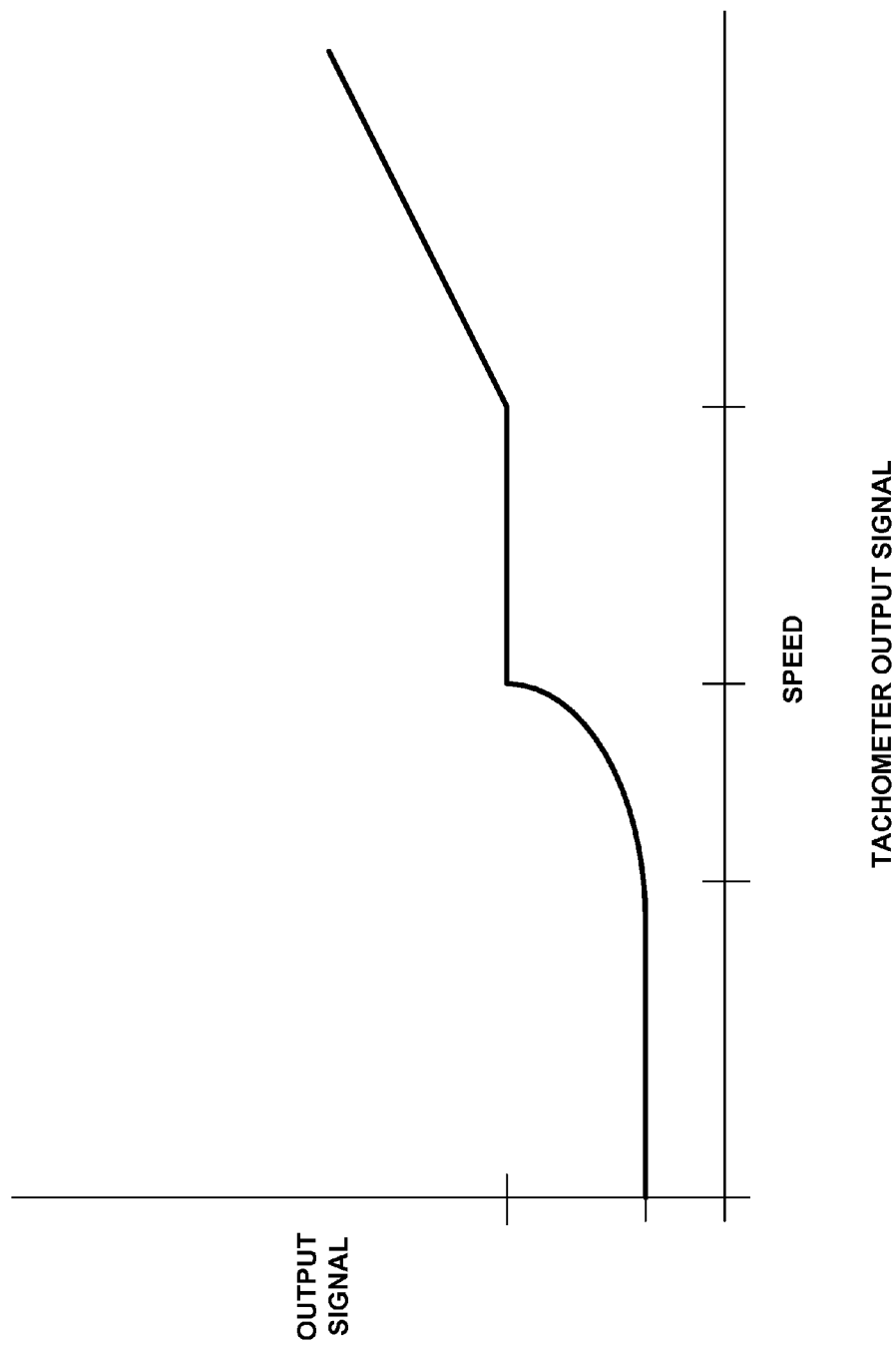

DYNAMIC CUE GENERATOR

CROSS-REFERENCE TO RELATED APPLICATIONS

This application claims priority from U.S. provisional patent application Ser. 61/375,349 filed on Aug. 20, 2010, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

The present invention pertains to apparatus and methods for synchronizing the operation of one or more associated machines.

BRIEF SUMMARY OF THE INVENTION

The subject invention generally comprises an electronic device or generator, and method of use, capable of receiving an input signal from a mechanism such as an encoder or a contrast sensor and sending multiple output signals that have been conditioned with defined attributes such as delay, pulse length, and amplitude. Additionally, the subject invention can perform intelligent functions such as fill-in, noise filtering, error notification, enabling or disabling devices, control of tachometer output, and speed compensation.

An aspect of the invention is to disclose a dynamic cue signal generator for processing one or more input and output signals to synchronize the operation of one or more associated machines.

Another aspect of the invention is to relate a dynamic cue signal generator that includes means for creating a signal delay between receiving an input signal and issuing an output signal; means for conditioning an input signal to produce an output signal with required parameters; means for producing a plurality of outputs signals; means for filling in undetected cues in an input signal to create a filled-in output signal; means for filtering noise from an input signal to generate a noiseless output signal; and means for generating an error output signal to indicate that an unusual event occurs in an input signal.

Disclosed is a dynamic cue signal generator and method for processing one or more input and output signals to synchronize the operation of one or more associated machines and includes: processes for creating a signal delay between receiving an input signal and issuing an output signal; for conditioning an input signal to produce an output signal with required parameters; for producing a plurality of outputs signals; for filling in undetected cues in an input signal to create a filled-in output signal; for filtering noise from an input signal to generate a noiseless output signal; and for generating an error output signal to indicate that an unusual event occurs in an input signal.

More specifically, the subject invention is a dynamic cue signal generator for processing one or more input and output signals to synchronize the operation of one or more associated machines. The subject dynamic cue signal generator comprises: means for creating a signal delay between receiving an input signal and issuing an output signal; means for conditioning an input signal to produce an output signal with required parameters; means for producing a plurality of outputs signals; means for filling in undetected cues in an input signal to create a filled-in output signal; means for filtering noise from an input signal to generate a noiseless output signal; and means for generating an error output signal to indicate that an unusual event occurs in an input signal.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 6. shows a tachometer output signal in which a signal's amplitude is a function of the system's speed in term of linear speed of cycle speed.

DETAILED DESCRIPTION OF THE INVENTION

Many high speed processes such as printing, folding, and cutting rely on the reliable detection of a reference (e.g.: cue mark; index pulse; material edge; and the like) to synchronize these manufacturing operations. An error in the detection, whether it be a false detection or a missed detection, would result in extremely undesirable failures. In addition to the loss of productivity and wasted material, quality errors could be the most damaging to a business if not discovered in time. Signals produced from contrast sensing devices and index pulses are notoriously unreliable. Elaborate systems can be employed to detect out-of-synchronized printing, miss-folded materials, and erroneous cut lengths, but reworking the ensuing rejected product is expensive. The need to reliably generate a cue signal is essential. This subject cue signal generator receives an input signal (or a plurality of signals) from the existing sensor or encoder, processes it, and outputs a new signal. Additionally, the subject cue generator can enable or disable associated devices, provide a signal whose amplitude is a function of the system speed, and incorporated speed compensation when required. These multiple very beneficial features are incorporated into the subject cue signal generator. It is stressed that these multiple features cannot be accomplished with a standard/traditional sensor or encoder. Each of the subject features is described in detail below.

Figure 1A:
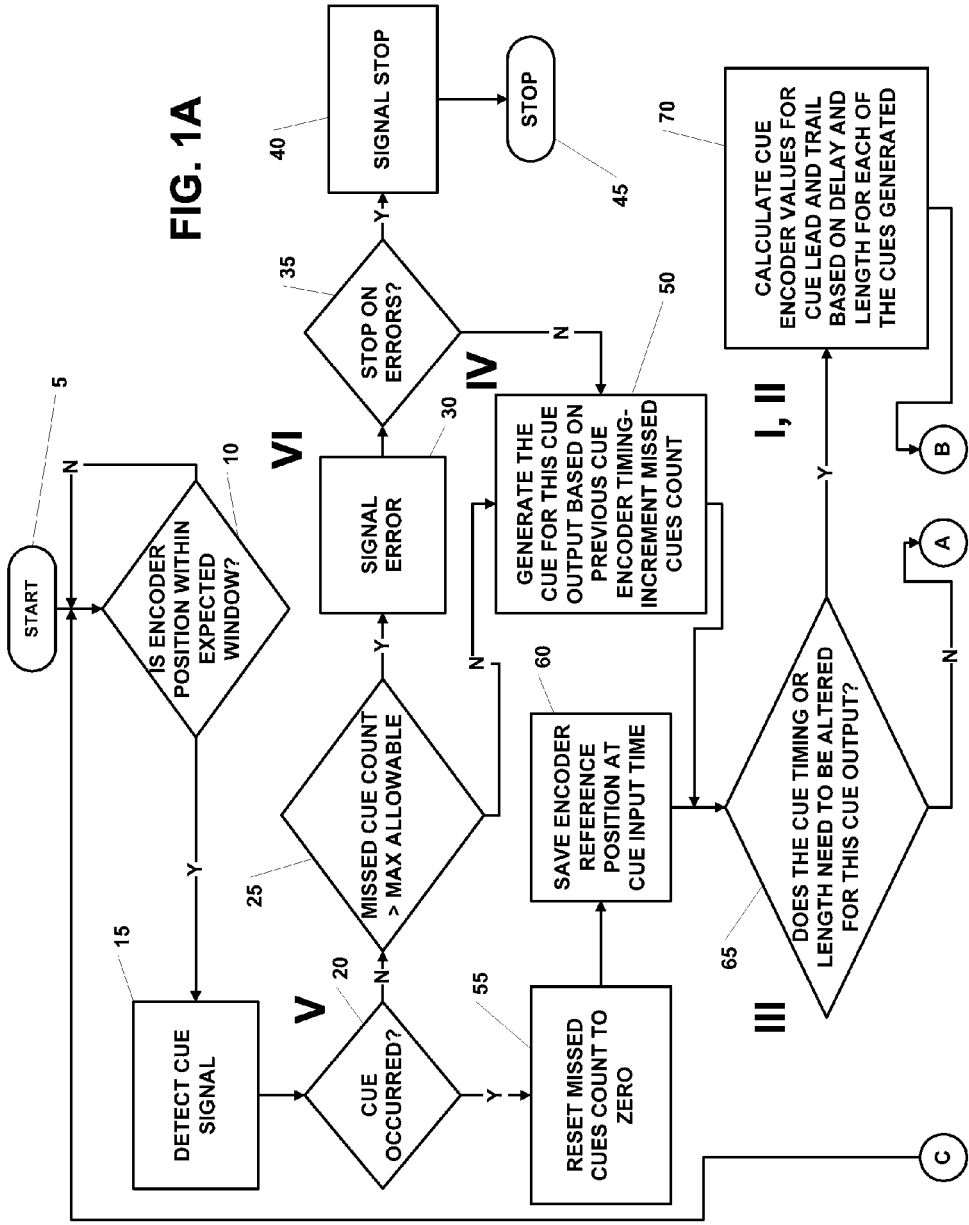
FIGS. 1A and 1B show a programming flow diagram for the subject invention that is, for clarity sake, broken into a top half (FIG. 1A) and a bottom half (FIG. 1B) with connecting lines running to and from circled indicators A, B, and C.
Figure 1B:
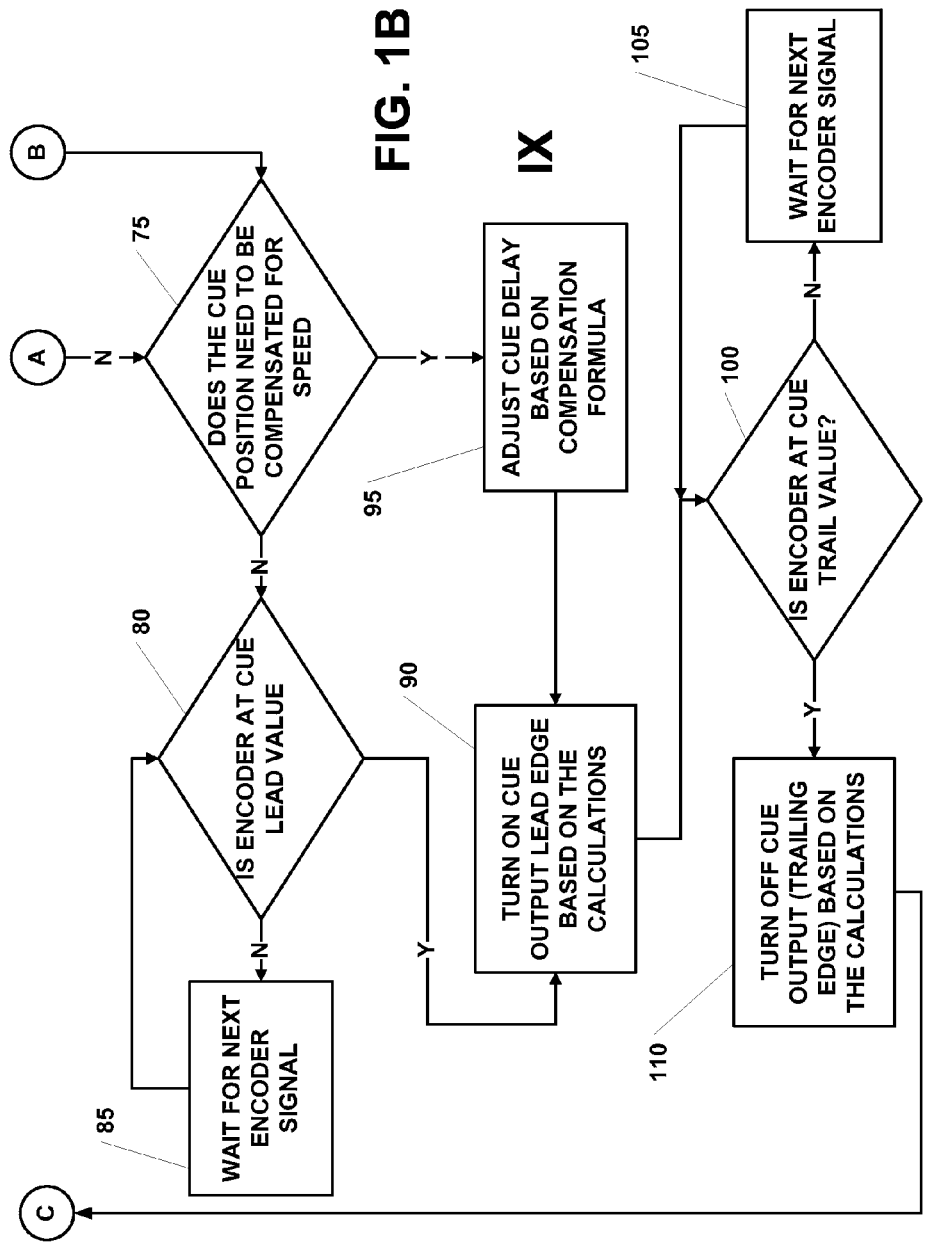
Figure 2:
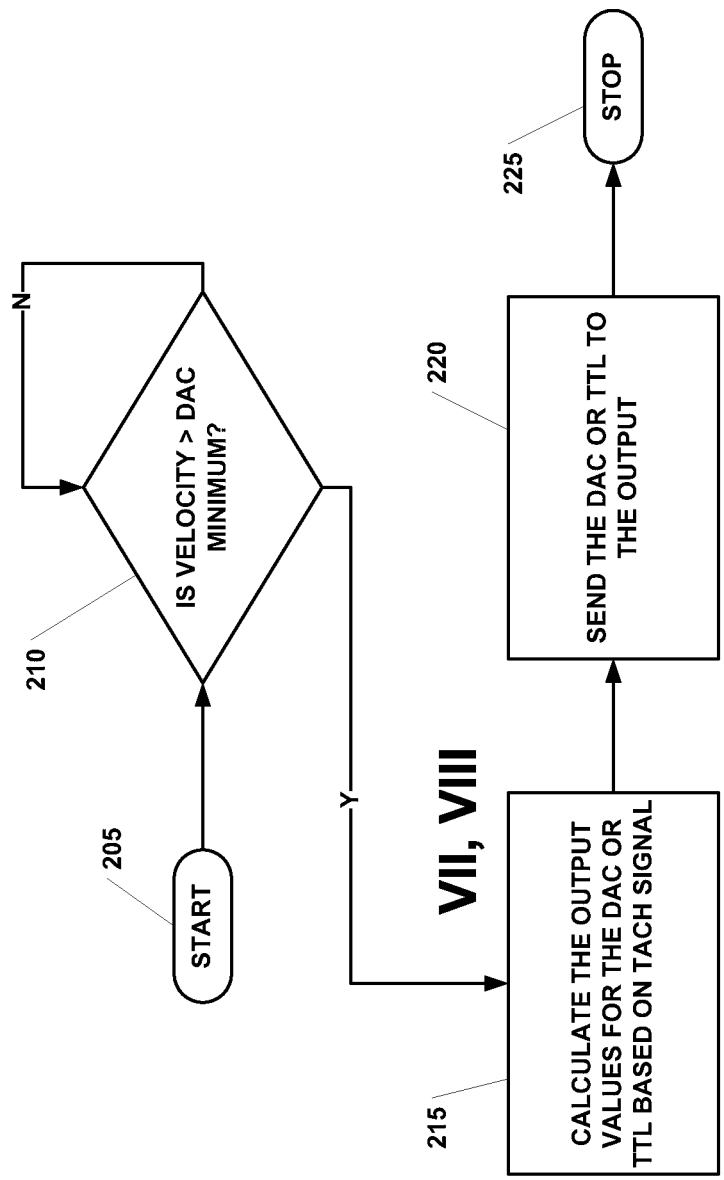
FIG. 2 is a programming flow diagram for the subject invention illustrating enabling and disabling signal generation and tachometer output control.

An overall operation of the subject system is shown in flow diagrams FIGS. 1A, 1B, and 2. In particular, FIGS. 1A and 1B comprise a single programming flow diagram that is divided into two pages for the sake of clarity. FIGS. 1A and 1B incorporate seven of the nine described features for the subject system while the remaining two features appear in FIG. 2.

Generally, FIGS. 1A and 1B illustrate the subject process that is carried out by the subject dynamic cue generator. All now known and later developed types of programming are acceptable for carrying out the subject invention so long as the programming accomplishes the various functions of the subject invention, as are combinations of hardware, firmware, and software suitably configured to produce and execute the subject process, subject system, and subject dynamic cue generator.

The subject process illustrated in FIGS. 1A and 1B is initiated at the start 5 point. Upon starting, the question 10 is asked "Is the encoder position within expected limits?" If the answer to the question 10 is "no" then the process returns to the start 5 and begins again until the encoder position is within the expected window. Following a "yes" answer to question 10 the process moves on to detect the cue signal 15, followed by a question 20 as to whether the cue did occur 20. If the cue did not occur the answer in "no" and question 25 is asked. If the answer to question 25 is "yes" and the missed cue count is greater than the maximum allowable a signal error 30 is issued and question 35 is generated to evaluate if the a "stop" should occur on errors. If the answer is "yes" then a stop signal 40 is sent and the process stops 45.

If either a "no" to question 25 or a "no" to question 35 is generated then the process moves on to step 50 in which the process generates the cue for this cue output based on the previous cue encoder timing since the increment missed the cues count. Coming back to question 20, if the answer to question 20 is "yes" then there the process resets the missed cues count to zero and proceeds to step 60 in which the encoder reference position is saved at the cue input time. Steps 50 and 60 then merge and question 65 is asked to determine if the cue timing or length need to be altered for the cue output. If the answer to question 65 is "yes" then the process moves to step 70 to calculate cue encoder values for the cue lead and trail based on delay and length for each of the cues generated and the process continues on to step 75 (please note that figure notation "B" is utilized to move from FIG. 1A to FIG. 1B on this path). The calculation at step 70 is a calculation of how long to delay the cue signal relative to the input signal. This is an offset from the input signal, where the length of the cue signal is empirical based on that the output device requires for operation.

If the answer to question 65 is "no" the process moves directly on to step 75 (please note that figure notation "A" is utilized to move from FIG. 1A to FIG. 1B on this path). Step 75 involves the question "Does the cue position need to be compensated for speed?" If the answer to question 75 is "no" then step 80 asks the question "Is the encoder at the cue lead value?" If the answer to question 80 is "no" then step 85 waits for the next encoder signal and loops back to step 80. If the answer to question 80 is "yes" then the process moves on to step 90 which turns on the cue output lead based on appropriate calculations. If the answer to question 75 is "yes" then the cue delay is adjusted based on an appropriate compensation formula in step 95 and then proceeds to step 90. The adjustment is either a linear or non-linear correction to the output signal timing, again based on the nature of the device needing the delay. For example, if the output is sent to an inkjet print head, the flight time of the ink from the head to the substrate is used and is corrected in a linear manner based on the substrate speed as it passes under the print head.

From step 90 the process jumps to question 100 which asks "Is the encoder at the cue trail value?" When the answer to question 100 is "no" the program proceeds to step 105 to wait for the next encoder signal and then loops back to question 100. If the answer to question 100 is "yes" the program moves on to step 110 to turn off the cue output (trailing edge) based on the calculations. Following step 110 the program loops back (via reference notation "C" between FIGS. 1A and 1B) to step 10.

FIG. 2 discloses a further aspect of the subject invention. The subject process is initiated at step 205 and proceeds to ask the question, at step 210, "Is the velocity greater than the DAC (digital-to-analog converter) signal minimum? If the answer to question 210 is "no" then the process loops back to this step 210 and asks the question again. If the answer to question 210 is "yes" the process moves on to step 215 which calculates the output values for the DAC or TTL (transistor-transistor logic) signal based on the tachometer signal. This calculation can be based on a logical on/off (binary) calculation, a linear calculation, non-linear calculation, logarithmic calculation, or even a polynomial expression calculation; essentially, any desired formula can be applied to an output signal. Following step 215 the program sends the DAC or TTL signal to the output at step 220 and then stops 25.

Figure 3:
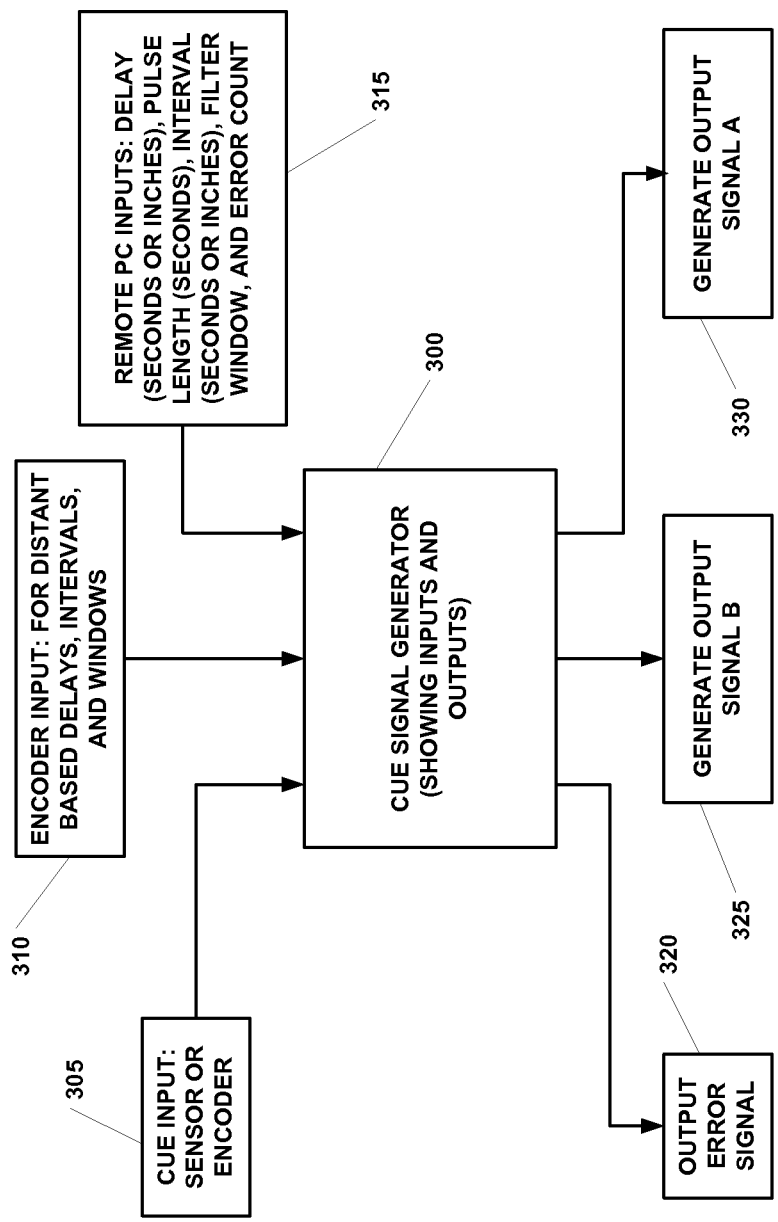
FIG. 3 shows various inputs and outputs processed and created by the subject generator.

FIG. 3 shows a generalized input and output flow diagram for the subject dynamic cue signal generator 300. Various input signal may be sent to the generator, including for exemplary purposes only and not by way of limitation: 1) a cue input 305 that comes from a sensor or encoder; 2) an encoder input 310 for distant based delays, intervals, and windows; and 3) remote PC inputs 315 such a delay (in seconds or inches), a pulse length (seconds), an interval (seconds or inches), a filter window, and an error count. Various output signals may be sent from the generator, including for exemplary purposes only and not by way of limitation: 1) an output error signal 320; 2) generate output signal A 330; and 3) generate output signal B 325.

The subject invention can accomplish multiple useful functions. Shown at various locations on FIGS. 1A, 1B, and 2 are the following nine functions, each denoted with a corresponding Roman numeral (the Roman numerals are placed on FIGS. 1A, 1B, and 2 proximate the location at which the function occurs).

I. Signal Delay (see FIGS. 1A and 1B, in particular FIG. 1A for Roman numeral "I")—In some machine operation cases it is not physically possible to position a sensor such that the detected cue corresponds with the signal driven operation. Likewise, the timing of an index pulse from an encoder may not correspond with the timing of the operation. The subject system/generator can be programmed (either remotely by a PC, internally, or the equivalent) to delay the generated output signal by a measure of time or distance (if distance, then the generator must have an input from an encoder corresponding to the material (paper and the like) movement). This, in effect, creates a virtual sensor located downstream in the process. For example, a continuous web of paper is moving through a printer and then cut in to individual sheets. A cue mark is printed on the web at 11" intervals (or any selected distance) to indicate the location to be cut. A contrast sensor is integrated into the printer such that the signal from the sensor initiates the cutter. The position of the sensor is adjusted so that the reaction of the cutter synchronizes with the mark. However, what if the required location of the sensor conflicted with other components of the printer such as web rollers? What if the reaction of the cutter was so fast that the position sensor needed to be inside the cutter itself? A major benefit of the subject signal system/generator is that it will allow the sensor to be located anywhere upstream of the cutter. The subject system/generator will receive the input signal from the sensor and delay the output signal by the required amount to produce the desired cut.

II. Signal Conditioning (see FIGS. 1A and 1B, in particular FIG. 1A for Roman numeral "II")—Often the original cue signal from the device (sensor, encoder, and the like) is a short pulse most likely the length of the cue mark. At higher machine speeds the original cue signal will be shorter and may not satisfy the triggering requirements of the manufacturing device. Also, the manufacturing device may have a different voltage requirement for the trigger than the rating of the sensor or encoder. This subject system/generator can condition the input signal so that the output signal has parameters that meet the requirement for pulse length and voltage. Pulse length can be programmed (either remotely by a PC, internally, or the equivalent) as a measure of time or distance (if distance, then the subject system/generator must have an input from an encoder corresponding to the material movement).

Figure 4:
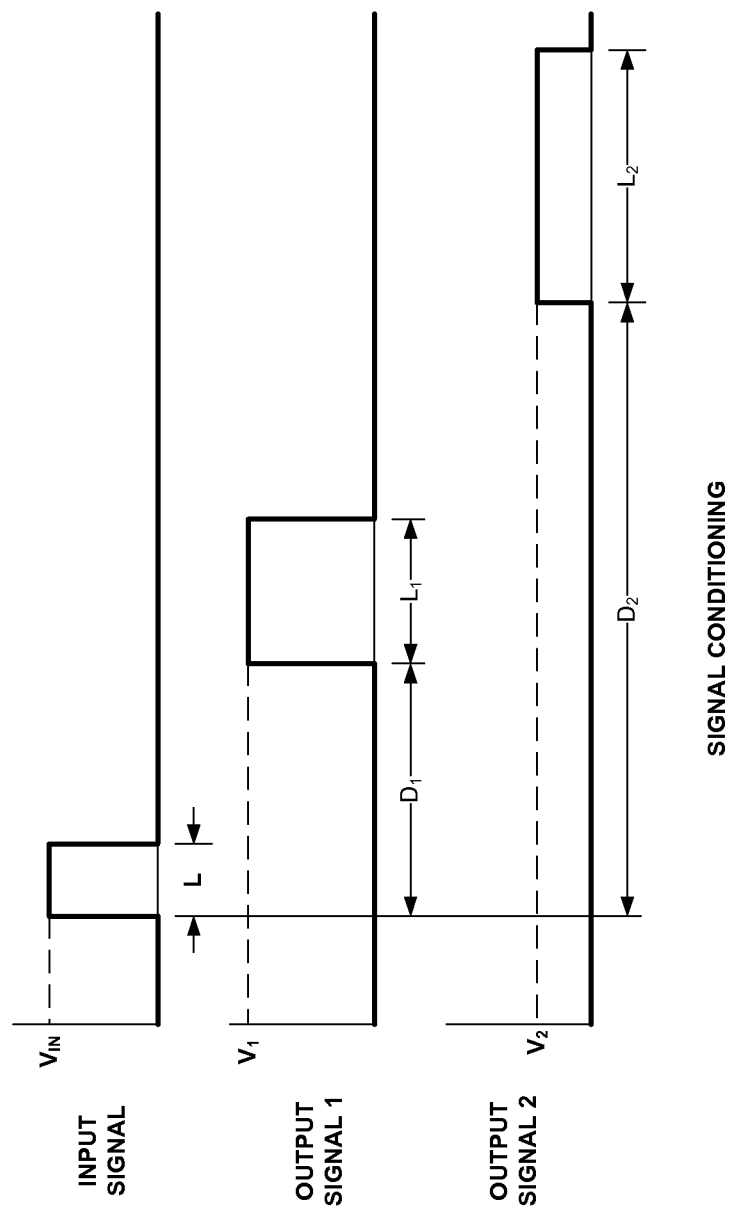
FIG. 4 illustrates that the subject generator can provide multiple output signals with each one with its own conditioning and delay.

FIG. 4 illustrates the signal conditioning (and the multiple output signal function, see immediately below) in which an input signal $V_{in}$ is received which is of a length L. The subject system/generator creates one or more output signals of appropriate magnitude, delay time ($D_1$, $D_2$, and the like), and length ($L_1$, $L_2$, and the like) as required for the particular physical situation.

III. Multiple Output Signals (see FIGS. 1A and 1B, in particular FIG. 1A for Roman numeral "III" and FIG. 4)—Many times in a process more than one operation requiring a cue trigger is performed on the work piece. This subject system/generator can provide multiple output signals each one with its own conditioning and delay. Again, as noted immediately above, multiple output signals are shown in FIG. 4, along with conditioning and delay.

Figure 5:
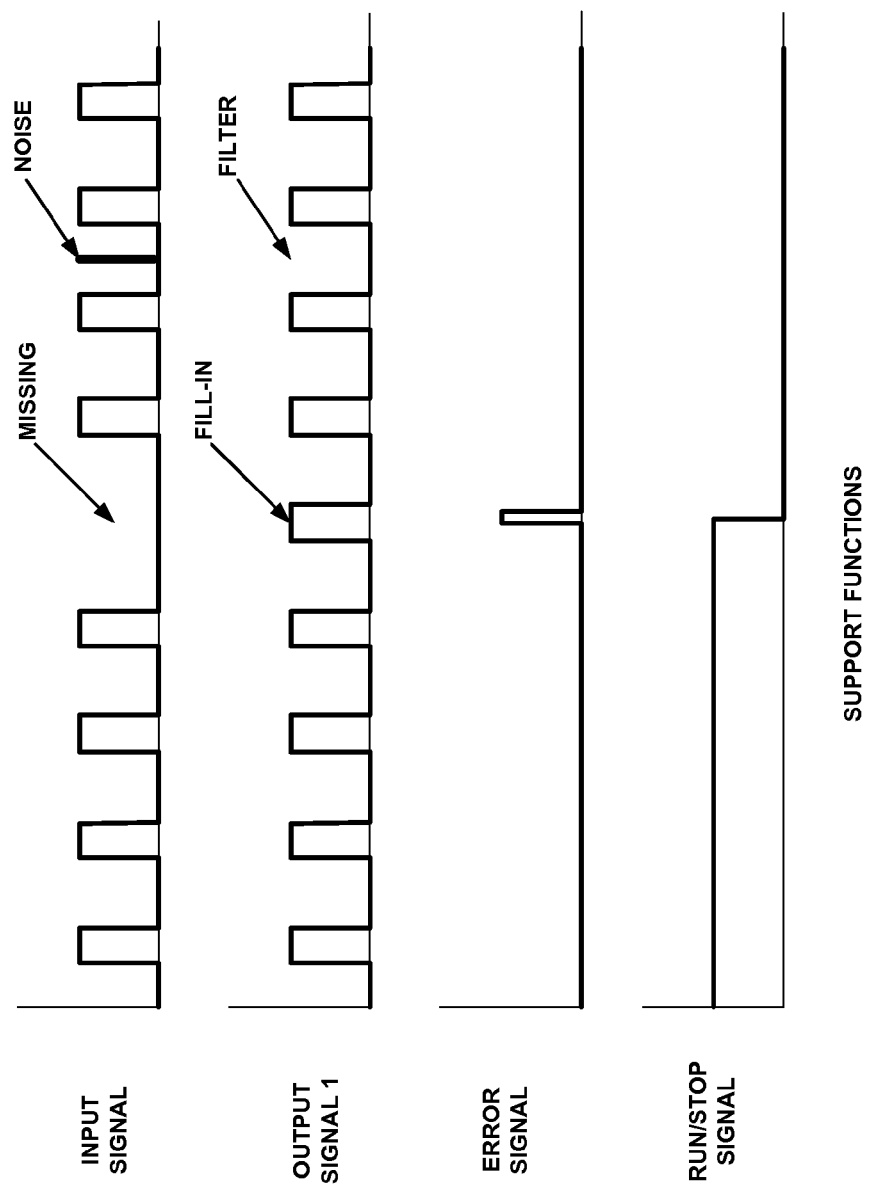
FIG. 5 shows that the subject invention included support functions that can fill-in missing data, filter-out noise, and issue an error signal to stop the associated equipment.

IV. Fill-in Undetected Cues (see FIGS. 1A and 1B, in particular FIG. 1A for Roman numeral "IV" and FIG. 5)—In a process where a cue signal occurs at a constant frequency, the subject system/generator monitors the existing cue signal which might be from a device such as sensor or encoder. The subject system/generator is programmed (either remotely by a PC, internally, or the like) with the defined interval between cues either measured as time or distance (if distance, then the generator must have an input from an encoder corresponding to the material movement). Each time the generator receives an input signal from the device it schedules an output signal to occur in the future based on the desired delay described previously and it also schedules contingent subsequent output signals based on the defined interval. If the subject system/generator receives an input signal corresponding to the next cue then all previously scheduled output signals are cancelled and new ones are scheduled based on this latest input signal. If the subject system/generator does not receive an input signal (note the top input signal graph in FIG. 5 that has a "missing" signal) then the scheduled output signal will be sent on time, thus filling-in for the undetected cue (note the second-from-the-top output signal 1 graph in FIG. 5 in which a "fill-in" signal is illustrated).

V. Noise Filtering (see FIGS. 1A and 1B, in particular FIG. 1A for Roman numeral "V" and FIG. 5)—Sometimes erroneous cue signals occur due to failures in the sensor or other marks are detected by the sensor. The same can occur with index pulses. This generator can filter this noise by narrowing the window of interest. The generator is programmed (either remotely by a PC, internally, or the like) to only be interested in input signals which occur within a window of time or distance (if distance, then the generator must have an input from an encoder corresponding to the material movement) of the expected input signal. Input signals received outside the window are ignored (note the top input signal input with noise and the second-from-the-top output signal 1 graph in FIG. 5 in which the noise peak is eliminated).

VI. Error Signal (see FIGS. 1A and 1B, in particular FIG. 1A for Roman numeral "VI" and FIG. 5)—Since cue signals are incorporated into increasing larger and more complex equipment, the ability to track the performance of the signal and react to it are advantageous. The subject system/generator will have an additional output signal (the error signal, see the third-from-the-top graph in FIG. 5) if an "unusually" event occurs which can be used in two different modes. In the first mode, the error signal will be sent with each output signal that was generated as a fill-in. Therefore, a high level PC (or the equivalent) can monitor the performance of the input device and stop the equipment (see the bottom graph in FIG. 5) when necessary to make adjustments or perform maintenance. In the second mode, the subject system/generator can be programmed (either remotely by a PC, internally, or the like) to issue an error signal after a defined number of consecutive fill-in signals to stop the equipment.

VII. Enable Signal (see FIG. 2 for Roman numeral "VII")—Sometimes in a system it is desirable to enable or disable a device based on the system's status such as its speed, cycle count, run time, and the like. The purpose of this enabling/disabling process could be for performance improvement, safety, economics, and the like. The subject system/generator can be programmed (either remotely by a PC, internally, or the like) to set the enable/disable conditions.

VIII. Tachometer Output (see FIG. 2 for Roman numeral "VIII" and FIG. 6)—Since the subject system/cue signal generator is normally receiving multiple inputs it can supply additional output signals other than triggers, such as a signal whose amplitude is a function of the system speed (either measured at linear speed or cycle speed). This can be used to control devices whose function need to vary with speed such as temperature, force, pressure, volume, and the like. The subject system/generator can be programmed (either remotely by a PC, internally, or the like) to define the equation for the output signal. An exemplary output signal is depicted in FIG. 6.

IX. Speed Compensation (see FIGS. 1A and 1B, in particular FIG. 1B for Roman numeral "IX")—Often the output signal is used to trigger a device which has a fixed reaction time such as the delay experienced when actuating an air cylinder, acquiring a digital image, squirting drops of glue or ink, and the like. In a system where events are scheduled to occur based on material position (requires an input from an encoder corresponding to the material movement), the timing of the output signal must be advanced to allow for this delay.

The signal is advanced in units of distance and is equal to the reaction time multiple by the material speed. However, if the speed varies then the advancement must vary. Since the subject system/generator is aware of speed, the distance to advance can be calculated as often as needed and when needed to provide an accurately timed output signal. The subject system/generator can be programmed (either remotely by a PC, internally, or the like) with the necessary parameters to make the required calculation.

Embodiments of the present invention may be described with reference to equations, algorithms, and/or flowchart illustrations of methods according to embodiments of the invention. These methods may be implemented using computer program instructions executable on a computer. These methods may also be implemented as computer program products either separately, or as a component of an apparatus or system. In this regard, each equation, algorithm, or block or step of a flowchart, and combinations thereof, may be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the equation (s), algorithm(s), and/or flowchart(s).

Accordingly, the equations, algorithms, and/or flowcharts support combinations of means for performing the specified functions, combinations of steps for performing the specified functions, and computer program instructions, such as embodied in computer-readable program code logic means, for performing the specified functions. It will also be understood that each equation, algorithm, and/or block in flowchart illustrations, and combinations thereof, may be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the equation (s), algorithm(s), and/or block(s) of the flowchart(s).

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A dynamic cue signal generator for processing one or more input and output signals to synchronize the operation of one or more associated machines, comprising:
    a) means for creating a signal delay between receiving an input signal and issuing an output signal;
    b) means for conditioning an input signal to produce an output signal with required parameters;
    c) means for producing a plurality of outputs signals;
    d) means for filling in undetected cues in an input signal to create a filled-in output signal;
    e) means for filtering noise from an input signal to generate a noiseless output signal;
    f) means for generating an error output signal to indicate that an unusual event occurs in an input signal; and
    g) a programmable processing apparatus for implementing functions of the dynamic cue signal generator.

2. A dynamic cue signal generator according to claim 1, further comprising:
    a) means for enabling and disabling an associate device based on predetermined parameters;
    b) means for generating an output signal whose amplitude is a function of a speed-related input signal; and
    c) means for producing an output signal that is modified in timing to compensate for a speed-related input signal.

3. A method for processing one or more input and output signals to synchronize the operation of one or more associated machines, comprising the steps:
    a) creating a signal delay between receiving an input signal and issuing an output signal;
    b) conditioning an input signal to produce an output signal with required parameters;
    c) producing a plurality of outputs signals;
    d) filling in undetected cues in an input signal to create a filled-in output signal;
    e) filtering noise from an input signal to generate a noiseless output signal; and
    f) generating an error output signal to indicate that an unusual event occurs in an input signal.

4. A method according to claim 3, further comprising the steps:
    a) enabling and disabling an associate device based on predetermined parameters;
    b) generating an output signal whose amplitude is a function of a speed-related input signal; and
    c) producing an output signal that is modified in timing to compensate for a speed-related input signal.

5. A system for processing one or more input and output signals to synchronize the operation of one or more associated machines, comprising:

a) means for creating a signal delay between receiving an input signal and issuing an output signal;
b) means for conditioning an input signal to produce an output signal with required parameters;
c) means for producing a plurality of outputs signals;
d) means for filling in undetected cues in an input signal to create a filled-in output signal;
e) means for filtering noise from an input signal to generate a noiseless output signal;
f) means for generating an error output signal to indicate that an unusual event occurs in an input signal; and
g) a programmable processing apparatus for implementing functions of the dynamic cue signal generator.

6. A system according to claim 5, further comprising:
a) means for enabling and disabling an associate device based on predetermined parameters;
b) means for generating an output signal whose amplitude is a function of a speed-related input signal; and
c) means for producing an output signal that is modified in timing to compensate for a speed-related input signal.

* * * * *